Aug. 16, 1960   C. L. CARLTON   2,949,103
LIQUID CIRCULATING SYSTEM FOR LIQUID COOLED
INTERNAL COMBUSTION ENGINE
Filed Sept. 11, 1959   4 Sheets-Sheet 4

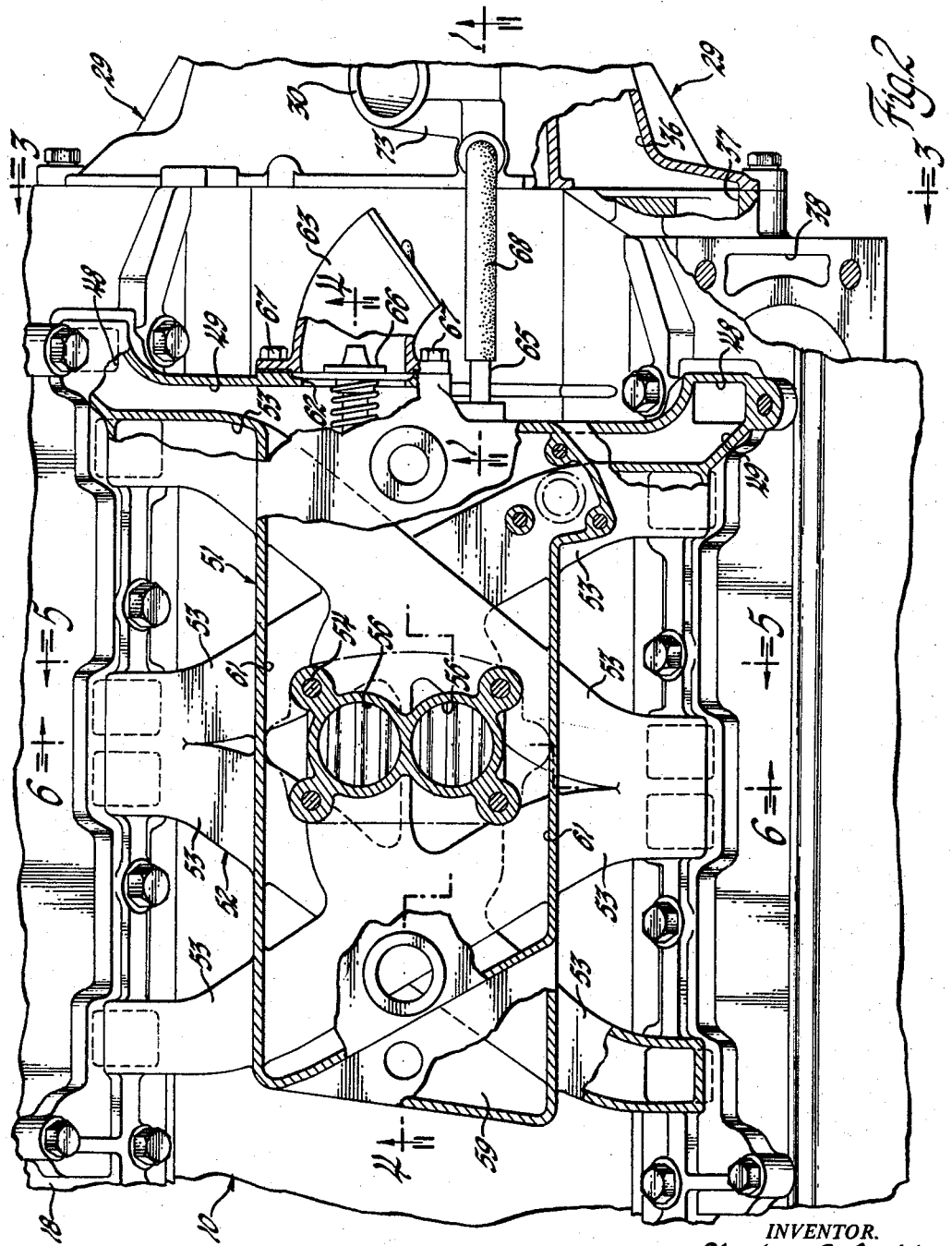

INVENTOR.
Chester L. Carlton
BY
L.D. Burch
ATTORNEY

INVENTOR.
Chester L. Carlton
BY
L. O. Burch
ATTORNEY

United States Patent Office 2,949,103
Patented Aug. 16, 1960

2,949,103

LIQUID CIRCULATING SYSTEM FOR LIQUID COOLED INTERNAL COMBUSTION ENGINE

Chester L. Carlton, Birmingham, Mich., assignor to General Motors Corporation, Detroit, Mich., a corporation of Delaware Filed Sept. 11, 1959, Ser. No. 839,338

9 Claims. (Cl. 123—122)

This invention relates to liquid circulating systems especially applicable for cooling the cylinders and heating the inlet manifolds for internal combustion engines for automotive and other purposes.

It has been the practice to cool the cylinders of an internal combustion engine with one circulating fluid and to heat the inlet manifold with another. Cylinders have usually been cooled by circulating water or other suitable liquid through jackets surrounding the cylinders and then cooling the liquid in a radiator from which the liquid is returned to the jackets by a pump or other suitable means. The inlet manifold has been heated by exhaust gas by employing bypass passages leading from the exhaust of the engine, it being usually the custom to employ an exhaust control valve to direct exhaust gas to such passages when the engine is warming up and to divert the exhaust gas from such passages during normal operation of the engine. It was found that cooling liquid was slow in heating and that exhaust gas was hot immediately. Since it was desirable to heat the exhaust manifold quickly, exhaust gas was considered preferable.

It is proposed to eliminate the exhaust heat valve and the various cross-over passages leading from the engine exhaust and to provide an exhaust system without these complications. It is also proposed to provide a liquid circulating system wherein the liquid will properly and adequately cool the cylinders, but will rapidly flow throughout the length of the engine heads and be heated quickly, while cooling the heads to the extent required until the engine is warmed up. It is proposed to convey this rapidly heated liquid from the heads to an elongated and restricted heating passage extending across the inlet manifold throughout as great a length as possible, so that the flow of liquid will remain continuous and rapid as in the heads. It is further proposed to employ the usual engine thermostat to be closed during the time the engine is warming up and to employ the usual bypass around the thermostat to the inlet side of the cooling liquid pump to limit the circulation to some extent so that cold water will not flow rapidly into the heads and into the manifold. Limiting the circulation by employing such a bypass will cause heated liquid in the heads to heat the manifold until the engine is hot enough to run normally, whereupon the engine thermostat will open to increase the flow of water through the heads and the manifold. This will tend to improve the cooling of the heads but decrease the heating of the manifold so that the engine will warm up properly but thereafter will be cooled properly, all of this being done merely by differently applying circulating liquid to the engine for cooling and heating purposes.

In the drawings:

Figure 1 is taken substantially in the plane of line 1—1 of Figure 2, looking in the direction of the arrows.

Figure 2 is a fragmentary plan view of the engine illustrated by Figure 1 and having parts of the engine broken away to better illustrate the liquid circulating system embodied therein.

Figure 3 is taken substantially in the plane of line 3—3 on Figure 2, looking in the direction of the arrows.

Figure 1:
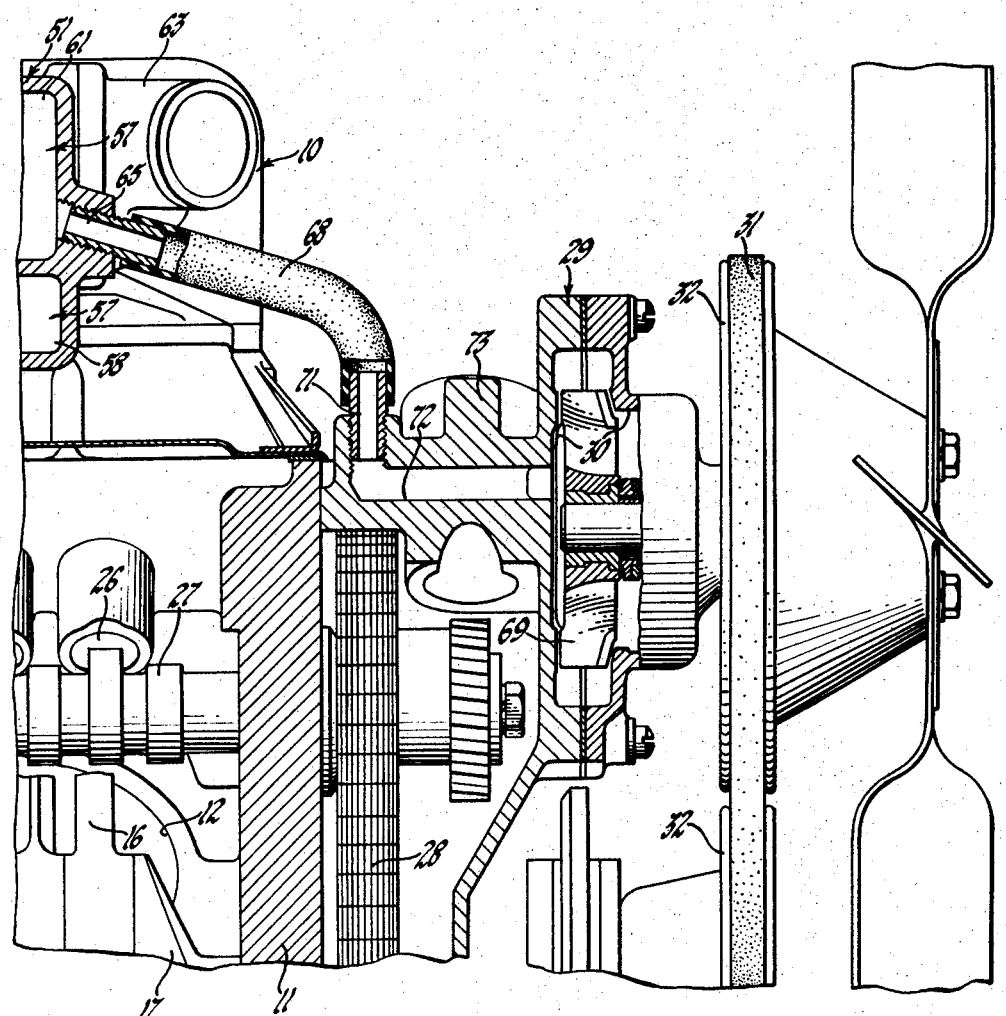
Figure 1 is a fragmentary longitudinal sectional view of an internal combustion engine embodying a liquid circulating system embracing the invention.
Figure 5:
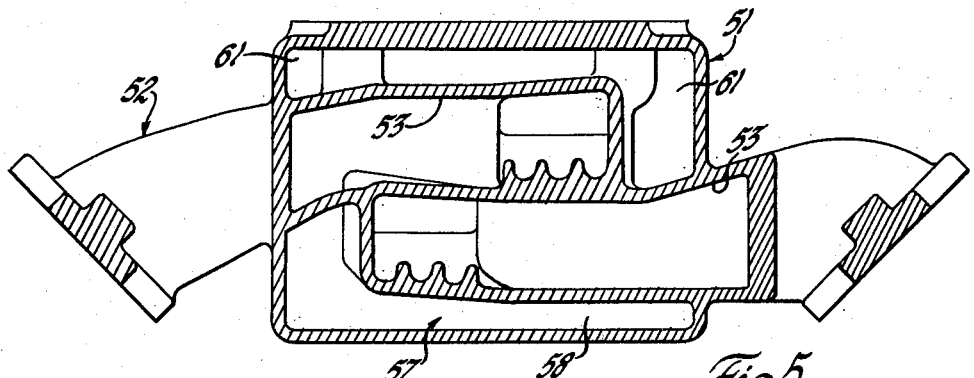
Figure 6:
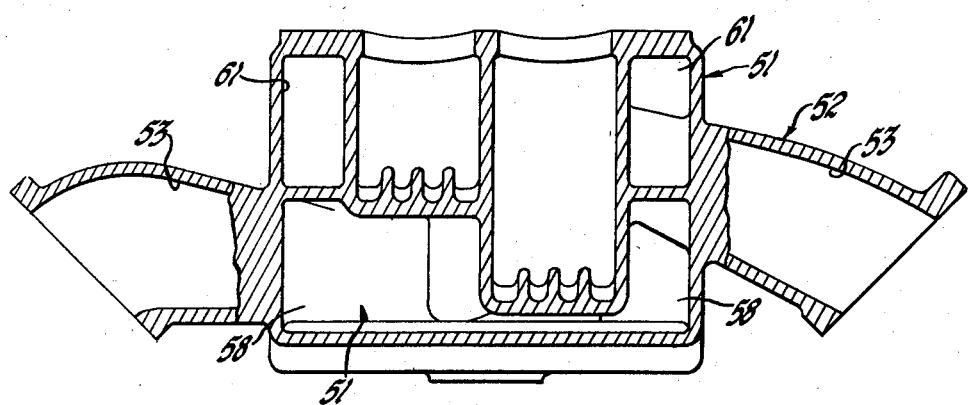
Figure 4:
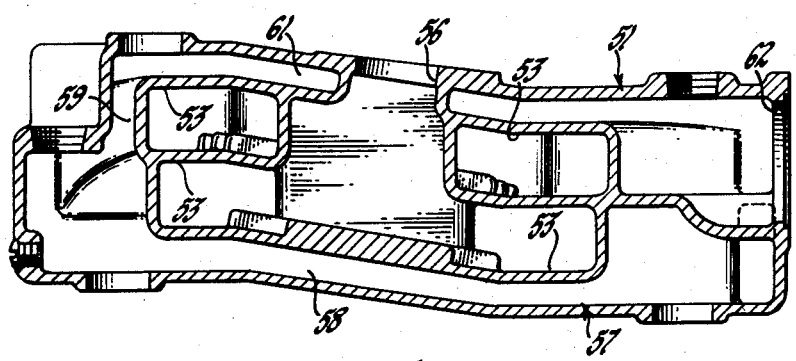

Figures 4, 5 and 6 are vertical sectional views of the inlet manifold and manifold heating means embraced in the engine illustrated by the preceding figures. Figures 4, 5 and 6 are taken substantially on lines 4—4, 5—5 and 6—6 of Figure 2, looking in the direction of the arrows.

Figure 7:
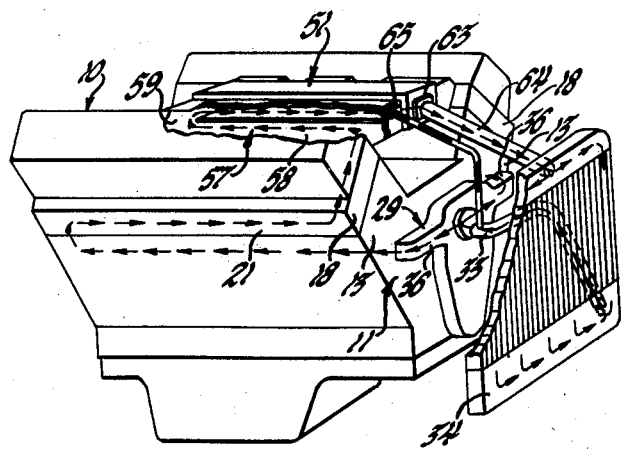
Figure 3:
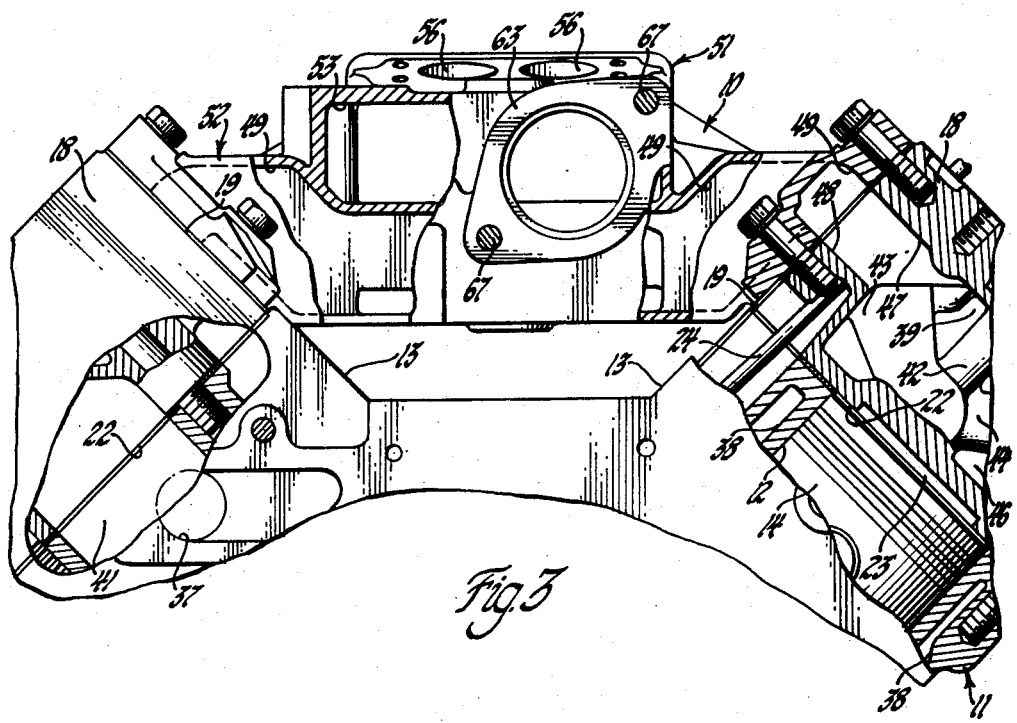
Figure 3 is a fragmentary front view of the engine, Figure 3 also having various parts of the engine broken away and shown in cross section to better illustrate the liquid circulating system embodied therein.

Figure 7 is a diagrammatical illustration of an internal combustion engine embodying the liquid circulating system embracing the invention.

The engine 10 embodying the invention has an engine block 11 in which cylinders 12 are formed in parallel rows or banks 13. The cylinders 12 have reciprocating pistons 14 operated by connecting rods 16 connected to a crankshaft 17 rotatably mounted on suitable bearings in the block 11 of the engine. The cylinders 12 in the rows or banks 13 have heads 18 closing the outer ends of the cylinders. The heads have inner walls 19 and outer walls 21 and lower walls 22, the latter walls with the cylinders 12 and the pistons 13 providing combustion chambers 23 for the cylinders 12. Inlet and exhaust valves mounted in the heads 18 control the operation of the cylinders. The valves are operated by valve mechanisms including push rods 24, valve lifters 26 and a cam shaft 27 driven by suitable driving means 28 from the crankshaft 17 of the engine. A cooling liquid pump 29 mounted on the front wall of the block 11 of the engine is driven through a belt 31 and a pair of pulleys 32 from the crankshaft 17 of the engine. The pump 29 has an inlet 30 connected by a conduit 33 to the lower part of a radiator 34 for cooling the cooling liquid employed in the engine. The pump 29 has outlet passages 36 connected to openings 37 in the front wall of the block 11 of the engine and communicating with cooling liquid cavities 38 formed in the block 11 throughout the length of the banks of cylinders 12 and surrounding the cylinders 12. The cavities 38 surrounding the cylinders 12 communicate with cavities 39 in the heads 18 through relatively wide connecting passages 41 formed in the upper walls of the cylinder banks 13 and the lower walls 22 of the heads and at the rear ends of the heads and beyond the last pair of the cylinders 12 in the rows or banks 13. The cavities 39 in the heads 18 are elongated cavities that are relatively restricted in cross sectional area and that are traversed and further restricted by valve stem guides 42 and inlet passages 43 and exhaust passages 44. The inner ends of the inlet and exhaust passages 43 and 44 terminate in the combustion chambers 23 for the cylinders 12 of the engine and at the outer ends respectively in the side walls 19 and 21 of the heads 18. The exhaust passages 44 slope outwardly from the inner walls 22 of the heads to provide liquid circulating passages 46 that extend beneath the exhaust passages at the lower extremities of the cavities 39 and form the connecting passages 41 throughout the length of the heads. The heads 39 are obliquely disposed on the ends of the rows of cylinders 13, thereby positioning the passages 46 at the lower extremities of the cavities 39 throughout the length of the heads. The heads 18 at the ends thereof opposite the connecting passages 41 are provided with upwardly extending outlet passages 47 which terminate in outlet ports 48 which are formed in the inner side walls 19. The lower ends of the outlet passages 47 communicate with the upper parts of the cavities 39 at the ends of the heads opposite the connecting passages 41. The ports 48 communicate with inlet passages 49 which are formed in the front end of a body 51 in which the inlet manifold 52 for the engine also is formed. The inlet manifold extends between the rows or banks of cylinders 13 and has mixture supply passages 53 communicating with each of the inlet passages 43 in the heads 18. A carburetor may be secured by bolts 54 to the inlet passages 56 for the manifold 52 for supplying combustible charges to the combustion chambers 23 for the cylinders 12 of the engine. The inlet passages 49 are adapted to supply heating fluid from the cavities 39 in the heads 18 of the engine to the front lower end of an elongated and relatively restricted heating cavity 57 formed in the manifold body around the middle and connecting parts of the inlet manifold supply passages 53. The cavity 57 extends rearwardly at 58 beneath the passages 53 to the rear end of the manifold 52, thence upwardly at 59 to a region above the manifold 52 and then forwardly at 61 to the front end of the manifold 52. The outlet 62 from the cavity 57 is adapted to be connected by an outlet coupling 63 and a conduit 64 to the upper end of the radiator 34 for the engine. A thermostatically controlled valve 66 is secured by bolts 67 between the outlet coupling 63 and the wall of the body 51 in which the outlet 62 is formed. The thermostat will operate the valve to control the flow of liquid outwardly through the opening 62 when the temperature of the liquid in the cavity 57 has increased to a predetermined value. A bypass passage 68 is provided for causing a continuous flow of liquid from the outlet end of the heating cavity 57 when the engine is cold and the thermostatic valve 66 has not been sufficiently heated by the liquid to open the outlet 62. The bypass passage 68 is connected to the front and outlet end of the upper part of the cavity 57 by a coupling 65 and to the inlet side of the impeller 69 of the pump 29 by a coupling 71 and a passage 72 formed in the casing 73 of the pump 29. The passage 72 communicates with the chamber of the impeller 69 on the side of the impeller opposite the inlet conduit 33, but this is also the inlet side 30 of the pump. The pump inlet 30 in the casing 73 and to which the inlet conduit 33 is connected also extends through the impeller between the impeller blades and to the rear of the impeller.

The capacity of the bypass 68 is not as great as the capacity of the conduit 64 and the radiator 34 and the conduit 33, but there is less distance for the liquid to travel through the bypass 68, so that there is considerable flow through the bypass 68 to the inlet 30 when the thermostatic valve 56 is closed. The principal difference is that when the liquid flows through the bypass 68 to the inlet, it is not cooled by the radiator 34 so that the heating of the liquid in the various cavities in the engine will take place at a very rapid rate. This is particularly true because the water heated in the cavities of the block will rise to the upper ends of the cylinders where it will be delivered immediately by the connecting passages 41 to the restricted cavities 39 in the heads 18. Since there is no other communication between the cavities in the block and the cavities in the heads, it will be apparent that the flow forwardly in the cavities 39 in the heads will be a relatively rapid and continuous flow and the liquid will be rapidly heated. By flowing through the heads in the circulating passages 46 and upwardly throughout the length of the heads as the liquid is heated by the walls 22 forming the upper parts of all of the combustion chambers and by the exhaust passages 44 leading from all of the cylinders, the liquid will thereafter collect in the upper parts of the leads and will rapidly flow to the outlet passages 47 where the heated water will be delivered by the outlet ports 48 and the inlet passages 49 directly into the lower part of the heating passage 57 in the manifold body 51. Since the heating passage 57 is long and narrow and shallow, the liquid will quickly flow around the various supply passages 53 of the exhaust manifold 52 and will be delivered to the outlet end of the heating passage 57. At the outlet end of the heating passage 57, it will be apparent that the liquid will flow rapidly to the inlet side of the pump through the bypass 68 and will tend to heat the thermostatic valve 66. When the thermostat of the valve is sufficiently heated which will occur when the inlet manifold has been warmed to a desired extent, the thermostatic valve 66 will open to allow the liquid to flow to the top of the radiator through the outlet conduit 64. Thereafter the liquid will be cooled in the radiator 34 to prevent the engine from overheating. As the liquid is cooled by the radiator, the rate of continuous flow of liquid in the cavities 39 of the heads 18 and in the cavity 57 of the inlet manifold 52 will increase to properly cool the heated parts of the heads and not excessively to cool the inlet manifold 52.

What is claimed is:

1. A liquid circulating system for liquid cooled internal combustion engines and comprising an engine block having a row of cylinders with cooling liquid cavities formed therein and surrounding said cylinders, a head for said row of cylinders with liquid cooling cavities formed therein and connected to said cavities in said block, said cavities being adapted for cooling said cylinders, a cooling liquid circulating pump at one end of said engine and connected to said cavities in said block for supplying cooling liquid to said cavities in said block, said connection between said cavities in said block and said cavities in said head being at the opposite end of said engine from said pump, said head being formed at said one end of said engine adjacent said pump to provide an outlet port communicating with said cavities in said head, outlet passage means formed in said engine and connecting said outlet port to the liquid cooling radiator for said engine, said cavities in said head being elongated and relatively restricted and continuous-flow cavities providing a rapid flow of cooling liquid through said head for limiting the cooling liquid contained in said head and for rapidly cooling said head, said cavities in said head communicating with said cavities in said block only through said connection at said opposite end of said engine from said pump.

2. A liquid circulating system for liquid cooled internal combustion engines and comprising an engine block having a row of cylinders with liquid cooling cavities formed therein and surrounding said cylinders, a head for said row of cylinders with liquid cooling cavities formed therein and connected to said cavities in said block, said head having inlet and exhaust passages terminating at the inner extremities thereof in a lower wall of said head forming a part of the combustion chambers for the cylinders of said engine, said inlet and exhaust passages extending from said lower wall and through said cavities in said head and terminating in opposite side walls of said head, said exhaust passages being spaced from said lower wall at a lower part of said lower wall and providing a continuous circulating passage extending throughout the length of said head and beneath said exhaust passages and adjacent the side wall of said head in which the outer ends of said exhaust passages terminate, a cooling liquid circulating pump at one end of said engine and connected to said cavities in said block for supplying cooling liquid to said cavities in said block, said connection between said cavities in said block and said cavities in said head being at the opposite end of said engine from said pump and being in direct communication with said continuous circulating passage in said head, said head being formed at said one end of said engine adjacent said pump to provide an upwardly extending outlet passage communicating with said cavities in said head and terminating in an outlet port in the other side wall of said head, outlet passage means formed in said engine and connecting said outlet port to the liquid cooling radiator for said engine, said cavities in said head being elongated and relatively restricted and continuous-flow cavities providing a rapid flow of cooling liquid through said head and for rapidly cooling said head, said cavities in said head communicating with said cavities in said block only through said connection at said opposite end of said engine from said pump, said circulating passage in said head supplying cooling liquid beneath the surfaces of said exhaust passages and beneath the surfaces of said wall forming a part of said combustion chamber to be heated by said surfaces throughout the length of said head to rise in said cavities in said head to the upper parts of said cavities throughout the length of said head and to flow in said upper parts of said cavities toward said upwardly extending outlet passage leading to said outlet port.

3. A liquid circulating system for liquid cooled internal combustion engines and comprising an engine block having a row of cylinders with cooling liquid cavities formed therein and surrounding said cylinders, a head for said row of cylinders with liquid cooling cavities formed therein and connected to said cavities in said block, said cavities being adapted for cooling said cylinders, a cooling liquid circulating pump at one end of said engine and connected to said cavities in said block for supplying cooling liquid to said cavities in said block, said connection between said cavities in said block and said cavities in said head being at the opposite end of said engine from said pump, said head being formed at said one end of said engine adjacent said pump to provide an outlet port communicating with said cavities in said head, an inlet manifold for supplying said cylinders with combustible fluid, heating liquid cavities formed in said manifold, outlet passage means formed in said engine and connecting said outlet port to said heating liquid cavities and said heating liquid cavities to the liquid cooling radiator for said engine, said cavities in said head and in said manifold being elongated and relatively restricted and continuous-flow cavities providing a rapid flow of cooling liquid through said head and a rapid flow of heating liquid through said manifold for limiting the cooling and heating liquid contained in said head and said manifold and for rapidly heating said cooling liquid in said head to be supplied as heating liquid to said manifold, said cavities in said head communicating with said cavities in said block only through said connection at said opposite end of said engine from said pump.

4. A liquid circulating system for liquid cooled internal combustion engines and comprising an engine block having a row of cylinders with cooling liquid cavities formed therein and surrounding said cylinders, a head for said row of cylinders with liquid cooling cavities formed therein and connected to said cavities in said block, said cavities being adapted for cooling said cylinders, a cooling liquid circulating pump at one end of said engine and connected to said cavities in said block for supplying cooling liquid to said cavities in said block, said connection between said cavities in said block and said cavities in said head being at the opposite end of said engine from said pump, said head being formed at said one end of said engine adjacent said pump to provide an outlet port communicating with said cavities in said head, an inlet manifold for supplying said cylinders with combustible fluid, heating liquid cavities formed in said manifold, outlet passage means formed in said engine and connecting said outlet ports to said heating liquid cavities and said heating liquid cavities to the liquid cooling radiator for said engine, said cavities in said head and in said manifold being elongated and relatively restricted and continuous-flow cavities providing a rapid flow of cooling liquid through said head and a rapid flow of heating liquid through said manifold for limiting the cooling and heating liquid contained in said head and said manifold and for rapidly heating said cooling liquid in said head to be supplied as heating liquid to said manifold, said cavities in said head communicating with said cavities in said block only through said connection at said opposite end of said engine from said pump, a thermostat in said outlet passage means and adapted until a predetermined temperature in said liquid is reached to restrict the flow of liquid from said cavities to said radiator, and a restricted bypass formed in said engine and around said thermostat and connecting said cavities in said manifold to the inlet side of said pump.

5. A liquid circulating system for liquid cooled internal combustion engines and comprising an engine block having a row of cylinders with cooling liquid cavities formed therein and surrounding said cylinders, a head for said row of cylinders with liquid cooling cavities formed therein and connected to said cavities in said block, said cavities being adapted for cooling said cylinders, a cooling liquid circulating pump at one end of said engine and connected to said cavities in said block for supplying cooling liquid to said cavities in said block, said connection between said cavities in said block and said cavities in said head being at the opposite end of said engine from said pump, an inlet manifold for supplying said cylinders with combustible fluid and having a row of ports, said heads having inlet passages leading to said cylinders and connected to said ports, heating liquid cavities formed in said manifold and extending lengthwise of said engine and having inlet and outlet passage means, said inlet passage means including an inlet passage formed in said manifold at said one end of said engine and adjacent said pump, said head being formed at said one end of said engine adjacent said pump to provide an outlet port connecting said cavities in said head with said inlet passage formed in said manifold, said outlet passage means including an outlet passage adapted to be connected to the liquid cooling radiator for said engine, said heating liquid cavities being formed in said manifold to extend from said inlet passage toward said opposite end of said engine on one side of said manifold and across said manifold and back to said outlet passage on the opposite side of said manifold, said cavities in said head and in said manifold being elongated and relatively restricted and continuous-flow cavities providing a rapid flow of cooling liquid through said head and a rapid flow of heating liquid through said manifold for limiting the cooling and heating liquid contained in said head and said manifold and for rapidly heating said cooling liquid in said head to be supplied as heating liquid to said manifold, said cavities in said head communicating with said cavities in said block only through said connection at said opposite end of said engine from said pump.

6. A liquid circulating system for liquid cooled internal combustion engines and comprising an engine block having a row of cylinders with cooling liquid cavities formed therein and surrounding said cylinders, a head for said row of cylinders with liquid cooling cavities formed therein and connected to said cavities in said block, said cavities being adapted for cooling said cylinders, a cooling liquid circulating pump at one end of said engine and connected to said cavities in said block for supplying cooling liquid to said cavities in said block, said connection between said cavities in said block and said cavities in said head being at the opposite end of said engine from said pump, an inlet manifold for supplying said cylinders with combustible fluid and having a row of ports, said head having inlet passages leading to said cylinders and connected to said ports, heating liquid cavities formed in said manifold and extending lengthwise of said engine and having inlet and outlet passage means, said inlet passage means including an inlet passage formed in said manifold at said one end of said engine and adjacent said pump, said head being formed at said one end of said engine to provide an outlet port connecting said cavities in said head with said inlet passage formed in said manifold, said outlet passage means including an outlet passage adapted to be connected to the cooling liquid radiator for said engine, said heating liquid cavities being formed in said manifold to extend from said inlet passage toward said opposite end of said engine on one side of said manifold and across said manifold and back to said outlet passage on the opposite side of said manifold, said cavities in said head and in said manifold being elongated and relatively restricted and continuous-flow cavities providing a rapid flow of cooling liquid through said head and a rapid flow of heating liquid through said manifold for limiting the cooling and heating liquid contained in said head and said manifold and for rapidly heating said cooling liquid in said head to be supplied as heating liquid to said manifold, said cavities in said head communicating with said cavities in said block only through said connection at said opposite end of said engine from said pump, a thermostat in said outlet passage and adapted until a predetermined temperature in said heating liquid is reached to restrict the flow of heating liquid from said cavities and said manifold to said radiator, and a restricted bypass passage formed in said engine and connecting said heating liquid cavities adjacent said outlet passage to the inlet side of said pump.

7. A liquid circulating system for liquid cooled internal combustion engines and comprising an engine block having parallel rows of cylinders with cooling liquid cavities formed therein and surrounding said cylinders, heads for said rows of cylinders with cooling liquid cavities formed therein and connected to said cavities in said block, said cavities being adapted for cooling said cylinders, a cooling liquid circulating pump for said engine and connected to said cavities in said block for supplying cooling liquid for cooling said cylinders, said connection between said cavities in said block and said cavities in said head being at one end of said engine, said heads being formed at the opposite end of said engine and on the sides of said head adjacent said inlet manifold to provide outlet ports communicating with said cavities in said heads, an inlet manifold disposed between said rows of cylinders for supplying said cylinders with combustible fluid, heating liquid cavities formed in said manifold, outlet passage means formed in said engine and connecting said outlet ports to said heating liquid cavities and said heating liquid cavities to the liquid cooling radiator for said engine, said cavities in said head and in said manifold being elongated and relatively restricted and continuous-flow cavities providing a rapid flow of cooling liquid through said heads and a rapid flow of cooling liquid through said manifold for limiting the cooling and heating liquid contained in said heads and said manifold and for rapidly heating said cooling liquid in said heads to be supplied as heating liquid to said manifold, said cavities in said heads communicating with said cavities in said block only through said connections at said opposite end of said engine from said pump.

8. A liquid circulating system for liquid cooled internal combustion engines and comprising an engine block having rows of cylinders with liquid cooling cavities formed therein and surrounding said cylinders, a cooling liquid circulating pump for said engine and connected to said cavities in said block for supplying cooling liquid for cooling said cylinders, heads for said rows of cylinders with liquid cooling cavities formed therein and connected to said cavities in said block, said heads having inlet and exhaust passages terminating at the inner extremities thereof in the lower walls of said heads forming parts of the combustion chambers for the cylinders of said engine, said inlet and exhaust passages extending from said lower walls and through said cavities in said heads and terminating in opposite side walls of said heads with said inlet passages terminating in the inner and the exhaust passage terminating in the outer side walls of said heads, said exhaust passages being spaced from said lower walls in the lower parts of said lower walls and providing continuous circulating passages extending throughout the length of said heads and beneath said exhaust passages and adjacent said outer side walls of said heads, said connections between said cavities in said block and said cavities in said head being in direct communication with said continuous circulating passages in said heads and being the only communication between said cavities in said block and said cavities in said head, said heads being formed at one end of said engine adjacent said pump to provide upwardly extending outlet passages communicating with said cavities in said heads and terminating in outlet ports in the inner side walls of said head, an inlet manifold disposed between said rows of cylinders for supplying said combustion chambers of said engine with combustible fluid, heating liquid cavities formed in said manifold, outlet passage means formed in said engine and connecting said outlet ports to said heating liquid cavities and said heating liquid cavities to the liquid cooling radiator for said engine, said cavities in said head and in said manifold being elongated and relatively restricted and continuous-flow cavities providing a rapid flow of cooling liquid through said head and a rapid flow of cooling liquid through said manifold for limiting the cooling liquid contained in said head and said manifold and for rapidly heating said cooling liquid and said head to be supplied as heating liquid to said manifold, said circulating passage in said head supplying cooling liquid beneath the surfaces of said exhaust passages and beneath the surfaces of said wall forming a part of said combustion chamber to be heated by said surfaces throughout the length of said head to rise in said cavities in said head to the upper parts of said cavities throughout the length of said head and to flow into said upper parts of said cavities toward said upwardly extending passages leading to said outlet ports.

9. A liquid circulating system for liquid cooled internal combustion engines and comprising an engine block having parallel rows of cylinders with cooling liquid cavities formed therein and surrounding said cylinders, heads for said rows of cylinders with cooling liquid cavities formed therein and connected to said cavities in said block, said cavities being adapted for cooling said cylinders, a cooling liquid circulating pump for said engine and connected to said cavities in said block for supplying cooling liquid for cooling said cylinders, an inlet manifold for supplying said cylinders with combustible fluid and having parallel rows of outlet ports, said head having inlet passages leading to said cylinders and connected to said ports, heating liquid cavities formed in said manifold and extending lengthwise of said engine between said rows of cylinders and having inlet and outlet passage means, said inlet passage means including oppositely disposed inlet passages formed in said manifold at one end of said engine and extending laterally toward said rows of cylinders, heating liquid outlet ports formed in said heads and connected to said inlet passages and supplying heating liquid to said manifold heating liquid cavities from said cooling liquid cavities in said heads, said outlet passage means including an outlet passage at said one end of said engine and being adapted to communicate with the cooling liquid radiator for said engine, said heating liquid cavities in said manifold being formed to extend from said inlet passages beneath said manifold and to the opposite end of said manifold and upwardly at the opposite end of said manifold and above and across said manifold to said outlet passage and communicating with said outlet passage, said heads being adapted to heat said cooling liquid in said head cavities to supply said heating liquid to said outlet ports and said inlet passages for heating said combustible fluid in said manifold for operating said engine.

No references cited.